(12) United States Patent
Monreal (10) Patent No.: US 12,257,722 B2
(45) Date of Patent: Mar. 25, 2025

(54) METHOD FOR DETECTING AND EVALUATING A FRICTION STATUS AT A JOINT, ROBOTIC ARM AND COMPUTER PROGRAM PRODUCT (71) Applicant: KUKA Deutschland GmbH, Augsburg (DE)

(72) Inventor: Karsten Monreal, Stadtbergen (DE)

(73) Assignee: KUKA Deutschland GmbH (DE)

( * ) Notice: Subject to any disclaimer, the term of this patent is extended or adjusted under 35 U.S.C. 154(b) by 249 days.

(21) Appl. No.: 17/922,028

(22) PCT Filed: Apr. 23, 2021

(86) PCT No.: PCT/EP2021/060667
§ 371 (c)(1),
(2) Date: Oct. 28, 2022

(87) PCT Pub. No.: WO2021/219506
PCT Pub. Date: Nov. 4, 2021

(65) Prior Publication Data
US 2023/0173678 A1 Jun. 8, 2023

(30) Foreign Application Priority Data
Apr. 28, 2020 (DE) ...................... 10 2020 205 379.0

(51) Int. Cl.
B25J 9/00 (2006.01)
B25J 9/16 (2006.01)
(Continued)

(52) U.S. Cl.
CPC ........... B25J 9/1674 (2013.01); B25J 13/085 (2013.01); B25J 17/00 (2013.01); B25J 19/0004 (2013.01); B25J 19/0095 (2013.01); G01L 5/28 (2013.01)

(58) Field of Classification Search
None
See application file for complete search history.

(56) References Cited

U.S. PATENT DOCUMENTS 10,350,753 B2 * 7/2019 Abe .................. B25J 19/02
2008/0140321 A1 * 6/2008 Blanc ................ B25J 9/1674
702/41

(Continued)

FOREIGN PATENT DOCUMENTS

CN 101200066 A 6/2008
CN 107073712 A 8/2017
(Continued)

OTHER PUBLICATIONS

European Patent Office; Search Report in related International Patent Application No. PCT/EP2021/060667 dated Jul. 14, 2021; 2 pages.

(Continued)

Primary Examiner — Truc M Do
(74) Attorney, Agent, or Firm — Dorton & Willis, LLP (57) ABSTRACT A method, a robot, and a computer program product for detecting and evaluating a friction status in at least one joint of a robotic arm, wherein, within the scope of a brake test program, at least one motor of a plurality of electric motors is driven automatically in a first rotational direction, wherein a detection of a first motor torque in the driven motor takes place during its rotation in the first rotational direction. The at least one motor is then driven in a second rotational direction opposite the first rotational direction, wherein a detection of a second motor torque in the driven motor takes place during its rotation in the second rotational direction. An automatic evaluation of the first motor torque and the second motor torque takes place in order to obtain the friction torque of the joint associated with the driven motor.

9 Claims, 4 Drawing Sheets (51) Int. Cl.
  *B25J 13/08* (2006.01)
  *B25J 17/00* (2006.01)
  *B25J 19/00* (2006.01)
  *G01L 5/28* (2006.01)

(56) References Cited

U.S. PATENT DOCUMENTS

| | | | |
|---|---|---|---|
| 2014/0172170 A1* | 6/2014 | Yoo | B25J 9/1633 |
| | | | 700/261 |
| 2015/0248121 A1* | 9/2015 | Nilsson | B25J 9/1641 |
| | | | 318/569 |
| 2018/0043525 A1* | 2/2018 | Su | G05B 19/425 |
| 2018/0169864 A1* | 6/2018 | Haddadin | G05B 9/03 |
| 2021/0088089 A1* | 3/2021 | An | F16D 55/025 |
| 2021/0276183 A1* | 9/2021 | Takahashi | B25J 9/1653 |
| 2021/0387335 A1* | 12/2021 | Holmner | B25J 9/126 |

FOREIGN PATENT DOCUMENTS

| | | |
|---|---|---|
| CN | 109571549 A | 4/2019 |
| EP | 3001164 A1 | 3/2016 |
| WO | 2020074089 A1 | 4/2020 |

OTHER PUBLICATIONS

Chinese Patent Office; Office Action in related Chinese Patent Application No. 202180031314.6 dated Apr. 3, 2024; 7 pages.
Chinese Patent Office; Office Action in related Chinese Patent Application No. 202180031314.6 dated Nov. 27, 2024; 8 pages.

* cited by examiner

METHOD FOR DETECTING AND EVALUATING A FRICTION STATUS AT A JOINT, ROBOTIC ARM AND COMPUTER PROGRAM PRODUCT

CROSS-REFERENCE TO RELATED APPLICATIONS

This application is a national phase application under 35 U.S.C. § 371 of International Patent Application No. PCT/EP2021/060667, filed Apr. 23, 2021 (pending), which claims the benefit of priority to German Patent Application No. DE 10 2020 205 379.0, filed Apr. 28, 2020, the disclosures of which are incorporated by reference herein in their entirety.

TECHNICAL FIELD

The invention relates to a method for detecting and evaluating a friction status in at least one joint of a robotic arm having a plurality of joints and a plurality of links connecting the joints to one another, wherein the robotic arm is connected to a robot controller which is designed and configured to control a plurality of electric motors of the robotic arm, said electric motors being associated with the joints of the robotic arm, and associated brakes of the robotic arm, in order to move the robotic arm.

BACKGROUND

EP 1 239 354 B1 discloses a method for controlling and monitoring a braking device which has a rated torque, which braking device is associated with a drive unit of a technical system such as a handling device, wherein a holding current of the drive unit, corresponding to a holding torque, is measured and stored when the braking device is open, and when the braking device is closed the drive unit is charged with an axis-specific current value that loads the braking device with a torque which is equal to or less than the rated torque of the braking device, wherein the drive is simultaneously monitored at standstill.

WO 2007/008940 A2 describes a system for state monitoring and error diagnosis, comprising: a data capture function that captures time profiles of selected variables for one or more of the components; a preprocessing function that calculates certain features of the time profiles; an analytical function for evaluating the features in order to generate one or more hypotheses of a state of the one or more components; and an argument function to determine the state of the one or more components from the one or more hypotheses. This system for state monitoring and error diagnosis is provided in particular for robots.

SUMMARY

The object of the invention is to be able to automatically detect and evaluate a friction status in at least one joint of a robotic arm in a simple and cost-effective manner.

The object is achieved by a method for detecting and evaluating a friction status in at least one joint of a robotic arm having a plurality of joints and a plurality of links connecting the joints to one another, wherein the robotic arm is connected to a robot controller which is designed and configured to control a plurality of electric motors of the robotic arm, said electric motors being associated with the joints of the robotic arm, and associated brakes of the robotic arm, in order to move the robotic arm, comprising the steps of:

automatically executing a brake test procedure associated with the robotic arm, which brake test procedure is provided for actuating the electric motors and the brakes of the robotic arm by means of the robot controller in order to automatically move the links of the robotic arm and automatically control the brakes in accordance with a brake test program specified by the brake test procedure, within the scope of the brake test program, automatically driving at least one motor of the plurality of electric motors in a first rotational direction and detecting a first motor torque in the driven motor during its rotation in the first rotational direction, and subsequently automatically driving the at least one motor in a second rotational direction opposed to the first rotational direction and detecting a second motor torque in the driven motor during its rotation in the second rotational direction, automatically evaluating the first motor torque and the second motor torque in order to obtain the moment of friction of the joint associated with the driven motor.

The detection thereby takes place without separate, special sensors. In particular, the detection is performed without separate, special sensors which are configured and designed exclusively for the purpose of detecting the friction in the joint. Rather, the friction status in the respective joint can be detected in an indirect manner, and in fact in that the electrical current consumption is detected in that electric motor which is associated with the joint to be detected and evaluated. It is particularly advantageous if the electrical currents in the respective motors are not detected by a special, separate current measurement; rather, the electrical currents in the respective motors, which are already detected within the scope of the brake test procedures which are to be performed anyway, are simply additionally evaluated in accordance with the method according to the invention. Inasmuch, independent, additional measurements of the electrical currents in the respective motors can be omitted.

The evaluation relates not only to the utilization of the electrical currents in the respective motors which are already detected within the scope of the brake test procedures, but rather also optionally to an enhanced evaluation of the detected electrical currents in the respective motors, for example with respect to a comparison of the detected electrical currents in the respective motors with prespecified maximum torques, with original moments of friction in the first-operation state, or with moments of friction from prior brake test procedures—i.e., stored electrical currents in the respective motors.

The friction status in at least one joint of the robotic arm can accordingly be derived from earlier and/or presently detected electrical currents in the respective motors of the respective joints.

The robot comprises the robotic arm and a robot controller. By means of the robot controller, the plurality of links can be adjusted relative to each other via the movements of the joints of the robotic arm, wherein a motor and a brake are associated with each driven joint. The respective motor is designed to move the joint associated with it, controlled by the robot controller, and in fact via automatic control of the motor. The robot controller is inasmuch designed to automatically control the motors in order to move the links of the robotic arm automatically and individually with respect to one another via driven movement of the joints. The robot controller also serves to automatically control the brakes in order to brake the joints of the robotic arm individually and to arrest them in position. The robot controller also automatically executes the corresponding brake test procedures in accordance with a brake test program.

The electric motors can be servomotors which are controlled and driven by the robot controller, or by drive amplifiers connected to the robot controller.

The brakes can in particular be electromechanical brakes which can be electrically controlled, i.e., activated, such that electrically driven mechanical braking elements, such as brake shoes or brake pads, which brake and arrest the associated joint of the robotic arm are moved.

The brake test program specifies in which way the brake of the respective joint is tested, i.e., examined, in order to be able to detect the present function of the brake.

In the first step, which has already been executed within the scope of a corresponding brake test program, a movement of the joint with which the brake to be tested is associated takes place in a first rotational direction. A first motor torque is thereby detected in the driven motor during its rotation in the first rotational direction.

In the second step, which is also executed within the scope of a corresponding brake test program, a subsequent automatic driving of the at least one motor takes place in a second rotational direction opposed to the first rotational direction. A second motor torque in the driven motor is thereby detected during its rotation in the second rotational direction.

Depending on the present position of the relevant joint, i.e., depending on the present axis position configuration of the robotic arm, the joint is loaded once with a directional component in the direction of gravity, and is loaded once with a directional component counter to the direction of gravity, via the rotation in the first rotational direction and via the rotation in the second rotational direction. However, the moment of friction is at least approximately the same in both directions of rotation. Accordingly, the gravitational moment can be eliminated from the first total torque in one rotational direction and from the second total torque in the other rotational direction. Since the total torque corresponds to the drive torque at the motor, which in particular is correlated with the drive current at the motor, the gravitational moment can be subtracted, and the remaining moment of friction of the relevant joint can be determined.

In the third step, an automatic evaluation of the first motor torque and the second motor torque accordingly automatically takes place in order to obtain the moment of friction of the joint associated with the driven motor.

Normally, brakes are provided in a robot system in order to hold the position of the robotic arm in the de-energized state of the robotic arm. Closed brakes on the joints of the robotic arm can accordingly be interpreted as joints which have a high joint friction. When the brakes are open, movements should be executed as easily as possible in the energized state of the robotic arm. Open brakes at the joints of the robotic arm can accordingly be interpreted as joints which have a low joint friction.

Further movable parts such as, for example, pivot bearings, motor shaft bearings, and gears are generally designed to generate as little friction as possible.

The incidence of a defective brake—that is, in the sense of a brake that applies an insufficient moment of friction in the de-energized state—can be determined by a cyclically executed brake test. It is thus accordingly ensured that a de-energized system does not inadvertently slacken due to gravitational influences, for example.

However, the incidence of a defective brake in the sense that the brake applies an excessive torque during operation, for example if the brake does not open correctly or if the electrical wiring is defective, has not been examined up to this time.

Therefore, it was previously necessary that secondary symptoms be accordingly correctly interpreted, for example by a service technician. The secondary symptoms may include messages of the following type: for example, "motor overload", "power monitoring", "transmission monitoring".

In addition, the incidence of an additional undesirably high friction during operation—such as, for example, bearing friction—has not previously been detected directly.

Generally, for reasons of cost, no additional sensors which can directly detect the friction, whereby such sensor values could be directly evaluated, should be installed in the system.

An optimally automatic detection of this described second failure case should be achieved with the invention without additional sensors being used.

With the method according to the invention, it is possible to prevent a, possibly long-term, undetected active latent overloading of the robot. An undesired overload can result in increased wear and/or higher energy consumption. Moreover, an impending longer-term failure of the robot due to a fault having a stronger effect can be prevented. A service technician can more quickly identify the actual cause of the disturbance, and can replace specific defective components, or otherwise remedy the fault—for example, by making the affected brake functional again, lubricating the gearing.

The detection of the fault can be simply integrated in existing workflows and production programs by the user of the robot, for example via an expanded evaluation of an existing brake test.

During a regularly executed and prescribed brake test, to evaluate the brake at the beginning of the brake test procedure, the joint can be initially moved in both directions when the brake is open in order to capture the friction status of the joint in both directions as long as the brake is not yet closed.

From both test movements, first in the one rotational direction and then in the opposite rotational direction, it is then possible, using the two measured motor torques, $M^+ = Mg + Mr$ and $M^- = Mg + Mr$ to approximately determine the gravitational moment Mg and the moment of friction Mr:

$Mg = (M^+ + M^-):2$ $Mr = |(M^+ - M^-):2|$

With these data, in the further course of the brake test procedure—with the condition that the drive does not move during the test—an effective brake torque is deduced via an activated motor torque.

According to the invention, the brake test procedure comprises an expansion of the existing evaluation to the effect that the determined effective moment of friction Mr itself is evaluated.

A first approximation of a meaningful, automatically-valid limit can already be the rated holding brake torque being tested. This accordingly results in the following consideration. If the friction of a system is itself on the order of magnitude of the friction to be caused by a brake in operation, the brake would not be necessary. Consequently, the presence of a friction of such a magnitude is an error.

If a moment of friction is determined which is greater than a threshold, which is optionally configurable or results by means of a percentile value of the test torque of the brake, a targeted error message can be output in time. Such a targeted error message can then be, for example: "Friction, axis 3, too high" or "Please check brake/gearing".

The moment of friction of the joint associated with the driven motor can be determined from the first motor torque and the second motor torque in that the moment of friction is calculated automatically as the absolute value of half of the difference of first motor torque and second motor torque.

In a first embodiment variant, the method can be implemented in such a way that the friction status of the at least one joint is automatically assessed as defective if the automatically determined moment of friction exceeds a prespecified maximum torque.

As such, the present moment of friction is first determined as described above. A simple evaluation can take place in such a way that a fault in the joint is concluded if the presently detected moment of friction exceeds a certain maximum torque. The maximum torque can be determined empirically, for example by experiments. The value of the maximum torque can, for example, be determined in such a way that certain variances in the actual moment of friction are permitted, and only moments of friction which markedly exceed an average value are considered to be impermissible values.

In particular, the rated torque, stipulated by the design, of that brake which is associated with the joint which is driven by the motor at which the first motor torque and the second motor torque were recorded can be used to determine the prespecified maximum torque. It can be assumed therefrom that the brake provided by design is matched to the requirements of the joint of the robotic arm with respect to its rated torque—i.e., the brake is neither overdimensioned nor underdimensioned. The rated torque of the brake which is associated with the relevant joint inasmuch gives a good indication of the order of magnitude that a present moment of friction should reasonably not reach. If the actual moment of friction is on the order of magnitude of the rated torque of the brake, the relevant joint cannot be properly functional.

In particular, a value between 20 percent and 40 percent of the rated torque value, as stipulated by the design, of that brake which is associated with the joint which is driven by the motor at which the first motor torque and the second motor torque were recorded can be used as the value of the prespecified maximum torque.

In a second embodiment variant, the method can be implemented in such a way that the friction status of the at least one joint is automatically assessed as defective if, upon a comparison of the automatically determined moment of friction and an original moment of friction determined in the delivery state of the robotic arm, a deviation of the automatically determined moment of friction from the original moment of friction, determined in the delivery state of the robotic arm or commissioning state of the robotic arm, is established that exceeds a prespecified threshold value.

In this second embodiment variant, the moment of friction as determined automatically within the scope of the brake test procedure is therefore not statically compared with a specified, fixed maximum value; rather, a comparison takes place with a moment of friction which was determined at a point in time from which it can be assumed that, at this point in time, the brake and the joint were in a correct state. This certainly-proper state can thus correspond to the commissioning state of the robotic arm.

In a third embodiment variant, the method can be implemented in such a way that the friction status of the at least one joint is automatically assessed as defective if, upon a comparison of a later moment of friction determined automatically within the scope of the execution of a second brake test procedure at a later point in time with a moment of friction determined automatically during the execution of a first brake test procedure at an earlier point in time, a deviation of the later-determined moment of friction from the previously determined moment of friction is established that exceeds a prespecified threshold value.

In this third embodiment variant, the moment of friction as determined automatically during the brake test procedure is therefore not statically compared with a specified, fixed maximum value, and is also not compared with a (static) moment of friction in a proper state; rather, a comparison takes place with an arbitrary moment of friction that has been determined during operation of the robotic arm at an earlier point in time. Several previously determined moments of friction which have been recorded at different points in time can be taken into account. In this way, it is even possible to derive a trend regarding the extent to which and at what speed the moment of friction in the joint is worsening. From this, an automatic recommendation can be derived regarding when maintenance should be performed and/or how long the robotic arm can still be operated without performing maintenance.

In all embodiments, the first motor torque of the driven motor and the second motor torque of the driven motor can be determined automatically from the respective electric motor currents of the motor during its rotation in the first rotational direction and in the second rotational direction.

Accordingly, the friction status in the respective joint can be detected in an indirect manner, in particular in that the electrical current consumption is detected in that electric motor which is associated with the joint to be detected and to be evaluated. It is particularly advantageous if the electrical currents in the respective motors are not detected by a special, separate current measurement; rather, the electrical currents in the respective motors, which are already detected within the scope of the brake test procedures which are to be performed anyway, are simply additionally evaluated in accordance with the method according to the invention. Inasmuch, independent, additional measurements of the electrical currents in the respective motors can be omitted.

The object is also achieved by a robot comprising a robotic arm with a plurality of joints and a plurality of links which can be positioned relative to each other via the movements of the joints of the robotic arm, wherein a motor and a brake are associated with each driven joint, wherein the respective motor is designed to move the joint associated with it, specifically by means of an automatic control of the motor; and comprising a robot controller which is designed to automatically control the motors in order to automatically and individually position the links of the robotic arm relative to each other via driven movement of the joints, and to automatically control the brakes in order to be able to individually brake the joints of the robotic arm and arrest them in place, wherein the robot controller is designed and configured to implement a method in accordance with any embodiment or a plurality of embodiments as described.

The object is moreover achieved by a computer program product comprising a machine-readable medium on which program code is stored, which can be read by a robot controller of a robot as described, and which instructs and/or configures the robot controller to implement a method according to one or more embodiments as described when the program code is executed by the robot controller.

The computer program product can be a CD, a DVD, or a USB stick, for example. However, the computer program product can also be a control card on which microprocessors are integrated. However, the computer program product can also be implemented in the form of a download that can be offered and sold over the Internet or another network.

The machine-readable carrier can thus be a CD, a DVD, or a microprocessor on which the program code is stored. However, the machine-readable carrier can also be a hard disk or an SSD drive onto which the program code has been downloaded, e.g., by means of a download—in particular, in the form of data packets.

The program code may be represented by an edited program and/or data stored on the machine-readable carrier.

By reading the edited program and/or the data, the reading robot controller is instructed and/or configured to be able to execute the method according to the invention.

The method according to the invention is implemented when the robot controller actually accordingly executes the program code, i.e., the edited program, and/or actually accordingly processes the data.

A specific embodiment of the invention is explained in more detail in the following description with reference to the accompanying figures. Specific features of this embodiment can represent general features of the invention regardless of the specific context in which they are mentioned, optionally also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
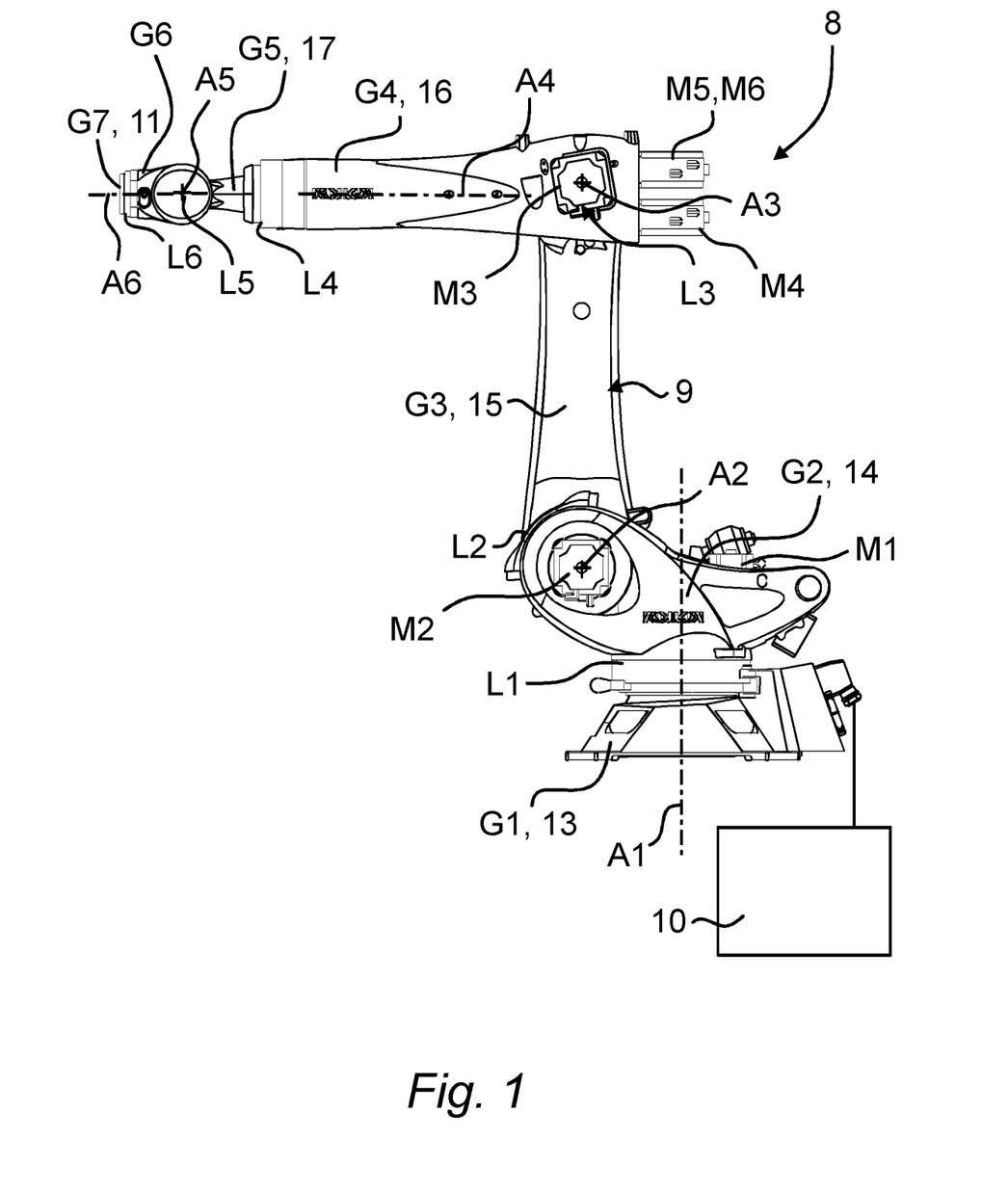
FIG. 1 shows an example of a robot in accordance with the present disclosure comprising a robotic arm with a plurality of links and a plurality of joints, wherein a separate motor and a separate brake are associated with each joint, and comprising a robot controller for controlling the robotic arm—in particular, the motors and brakes of the joints.

FIG. 1 shows an industrial robot 8 which has a robotic arm 9 and a robot controller 10. In the instance of the present exemplary embodiment, the robot arm 9 comprises several successively arranged links G1 through G7 connected to one another by means of joints L1 through L6 so as to be able to rotate.

The industrial robot 8 has the robot controller 10 which is designed to execute a robot program and to move the links G1-G7 and joints L1-L6 of the robot arm 9 automatically. One of the several links G1-G7 forms an end link (G7) of the robot arm 9, which has a tool flange 11.

The robot controller 10 of the industrial robot 8 is designed or configured to execute a robot program via which the links L1 through L6 of the robot arm 9 can be automated or automatically adjusted or moved in rotation in a manual mode in accordance with the robot program. For this purpose, the robot controller 10 is connected to controllable electric drives, the motors M1 through M6, which are designed to move the respective joints L1 through L6 of the robotic arm 9.

In the instance of the present exemplary embodiment, the links G1 through G7 are a robot base frame 13 and a carousel 14 which is borne so as to be rotatable, relative to the robot base frame 13, about a vertically traveling axis A1. Further elements of the robot arm 9 are a link arm 15, a boom arm 16, and a preferably multi-axis robot hand 17 with a fastening device designed as a tool flange 11 for fastening a tool. The link arm 15 is mounted at the lower end on the carousel 14, i.e., at the link L2 of the link arm 15, which can also be referred to as the pivot bearing head, so as to be pivotable about a preferably horizontal axis of rotation A2.

At the upper end of the link arm 15, the boom arm 16 is in turn mounted at the one link L3 of the link arm 15 so as to be pivotable about a likewise preferably horizontal axis A3. At its end, said boom arm supports the robot hand 17 with its preferably three axes of rotation A4, A5, A6. The joints L1 to L6 can be driven in a program-controlled manner by a respective one of the electric motors M1 to M6 via the robot controller 10, and can be braked and arrested in place by means of the brakes B1 to B6 associated with the joints L1 to L6 or the motors M1 to M6.

Figure 2:
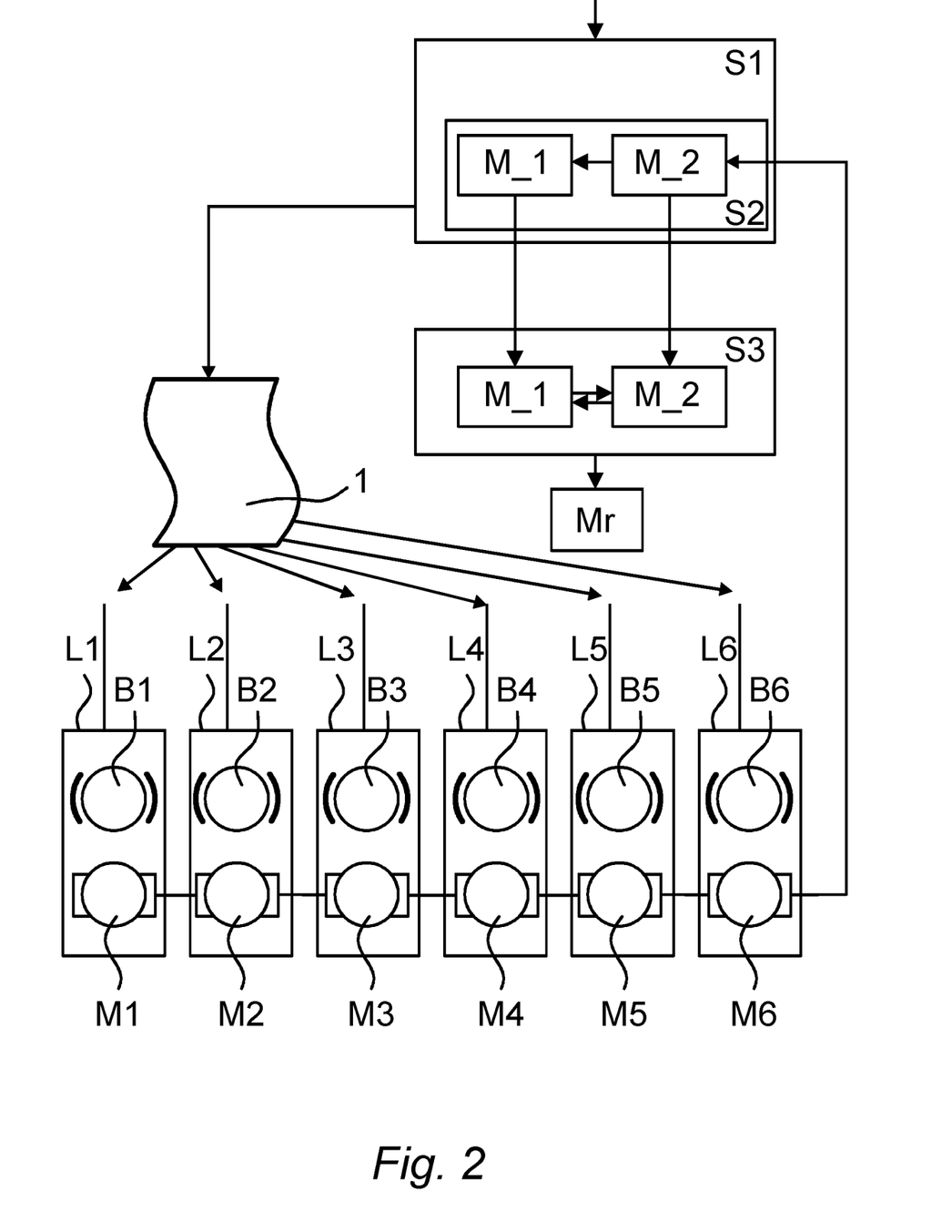
FIG. 2 shows a schematic presentation of the basic method in accordance with the present disclosure.

FIG. 2 illustrates the method for detecting and evaluating a friction status in at least one joint L1 to L6 of the robotic arm 9 having a plurality of joints L1-L6 and a plurality of links G1-G7 connecting the joints L1-L6 to each other, wherein the robotic arm 9 is connected to the robot controller 10, which is designed and configured to control a plurality of electric motors M1-M6 of the robotic arm 9 associated with the joints L1-L6 of the robotic arm 9 and associated brakes B1-B6 of the robotic arm 9 in order to move the robotic arm 9.

In a first step S1, in the instance of the present exemplary embodiment, a brake test procedure associated with the robotic arm 9 is automatically executed in accordance with a brake test program 1 which is provided to control the electric motors M1-M6 and the brakes B1-B6 of the robotic arm 9 by means of the robot controller 10 in order to automatically move the links G1-G7 of the robotic arm 9 in accordance with the brake test program 1 specified by the brake test procedure, and to automatically control the brakes B1-B6.

In a second step S2, in the instance of the present exemplary embodiment, and within the scope of the brake test program 1, at least one motor of the plurality of electric motors M1-M6 is automatically driven in a first rotational direction, and a first motor torque $M\_1$ is detected in the driven motor during its rotation in the first rotational direction, and subsequently the at least one motor is automatically driven in a second rotational direction opposed to the first rotational direction, and a second motor torque $M\_2$ is detected in the driven motor during its rotation in the second rotational direction.

In the third step S3, in the instance of the present exemplary embodiment the first motor torque $M\_1$ and the second motor torque $M\_2$ are automatically evaluated in order to obtain the moment of friction Mr of the joint associated with the driven motor.

The moment of friction Mr of the joint associated with the driven motor can be determined from the first motor torque M_1 and the second motor torque M_2 in that the moment of friction Mr is automatically calculated as the absolute value of half of the difference between the first motor torque M_1 and the second motor torque M_2.

The friction status of the at least one joint is automatically assessed as defective if, for example, the automatically determined moment of friction Mr exceeds a prespecified maximum torque.

To determine the prespecified maximum torque, the design-dependent rated torque can be used of that brake which is associated with the joint which is driven by the motor in which the first motor torque M_1 and the second motor torque M_2 were detected.

For example, a value between 20 percent and 40 percent of the design-dependent rated torque value of that brake which is associated with the joint which is driven by the motor in which the first motor torque M_1 and the second motor torque M_2 were detected can be used as the value of the prespecified maximum torque.

The friction status of the at least one joint can be automatically assessed as defective when, for example, upon a comparison of the automatically determined moment of friction Mr with an original moment of friction determined in the delivery state of the robotic arm 9, a deviation of the automatically determined moment of friction Mr from the original moment of friction determined in the delivery state of the robotic arm 9 or commissioning state of the robotic arm 9 is identified which exceeds a prespecified threshold value.

The friction status of the at least one joint can be automatically assessed as defective when, for example, upon a comparison of a later moment of friction, determined automatically within the scope of an execution of a second brake test procedure at a later point in time, with an earlier moment of friction, determined automatically within the scope of an execution of a first brake test procedure at an earlier time, a deviation of the later determined moment of friction from the earlier determined moment of friction is identified which exceeds a prespecified threshold value.

The first motor torque M_1 of the driven motor and the second motor torque M_2 of the driven motor can be determined automatically from the respective electric motor currents of the motor during its rotation in the first rotational direction and in the second rotational direction.

Figure 3:
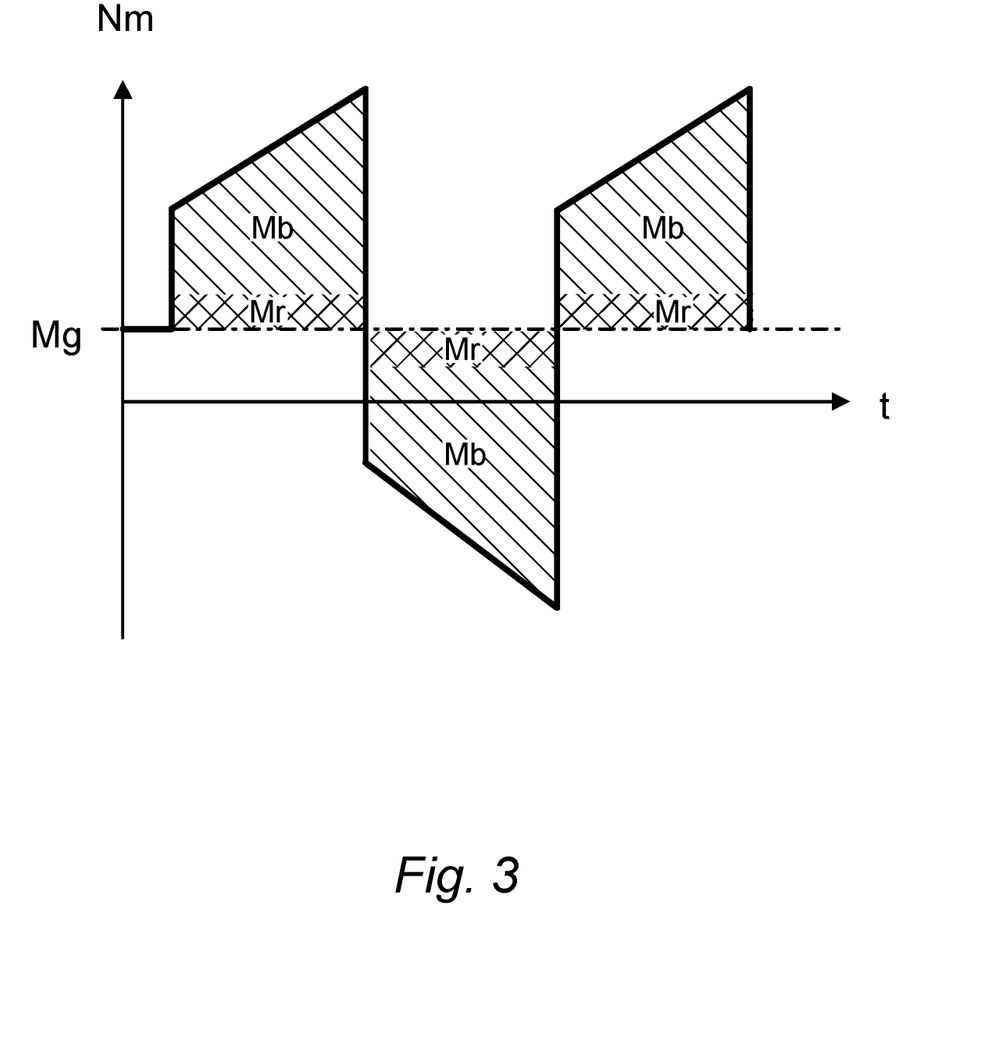
FIG. 3 shows a schematic presentation of the relationship between gravitational moment, moment of friction, and holding brake torque during the implementation of an exemplary brake test procedure.

Shown in FIG. 3 is a schematic presentation of the relationship between gravitational moment, moment of friction, and holding brake torque during the implementation of an exemplary brake test procedure. The gravitational moment Mg always acts with the same magnitude and in the same direction. The braking torque Mb increases in the one rotational direction up to a maximum value. Then, a switch is made to the other rotational direction in that the braking torque Mb is continuously reduced. The moment of friction corresponds to half of the torque difference in the one direction and in the other rotational direction. This is also illustrated in particular in FIG. 5.

Figure 4:
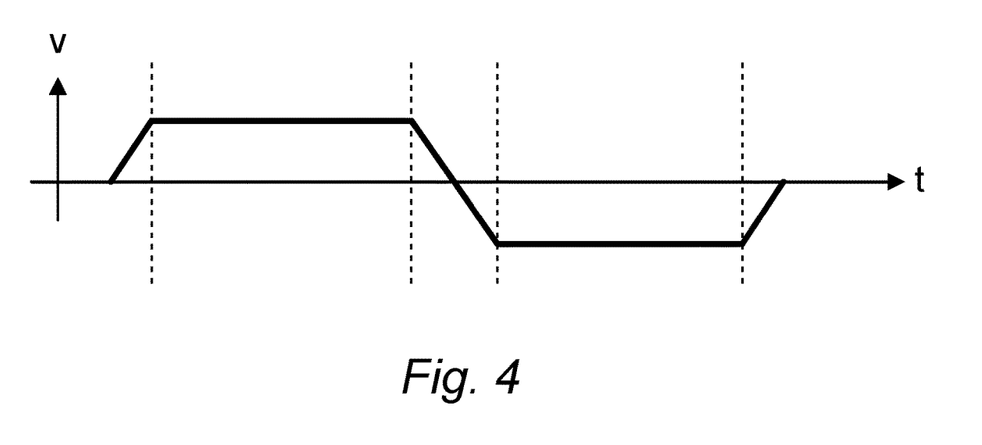
FIG. 4 shows a schematic presentation of a profile of the joint movement during the implementation of an exemplary brake test procedure, in a v/t diagram.

FIG. 4 shows a schematic presentation of a profile of the joint movement during the implementation of an exemplary brake test procedure in a v/t diagram. The motor is first started up—i.e., it is accelerated—in order then to move the joint at a constant speed in the first rotational direction. Subsequently, it is braked and accelerated in the other rotational direction in order to then move the joint at a correspondingly opposite constant speed in the other rotational direction. In accordance with this acceleration and speed profile of the brake test procedure, a curve of the total torque in the motor is established, as is shown schematically in FIG. 5.

Figure 5:
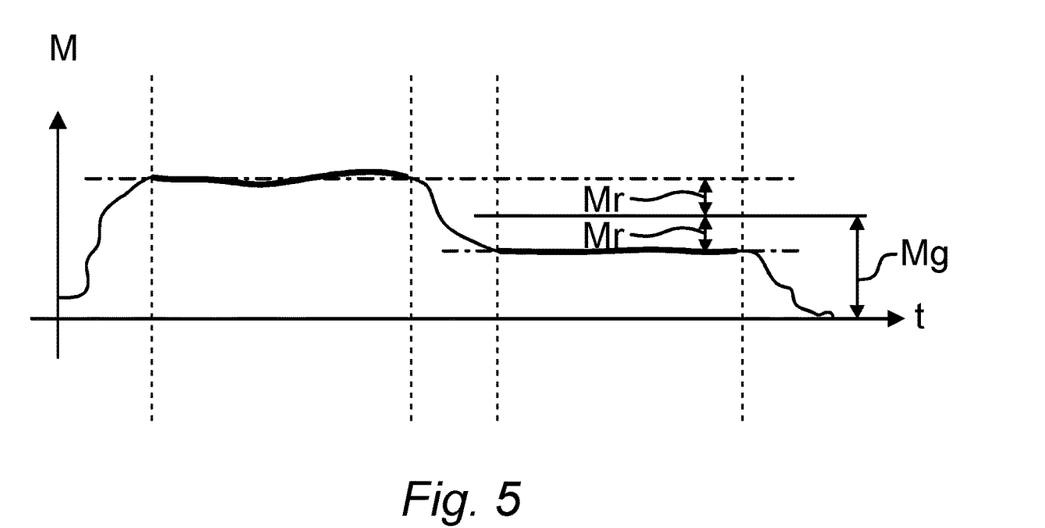
FIG. 5 shows a schematic presentation of a representative curve of the total torque at the respective joints during the implementation of an exemplary brake test procedure.

Shown in FIG. 5 is a schematic presentation of a representative curve of the total torque M in the respective joint during the implementation of an exemplary brake test procedure. The different heights of the plateau phases of the total torque M result in that the gravitational moment acts in the same way both upon the rotational movement in the first rotational direction and upon the opposite rotational movement in the second rotational direction. The torque difference between the two plateau phases of the total torque M corresponds to twice the moment of friction.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for detecting and evaluating a friction status in at least one joint of a robotic arm that includes a plurality of joints and a plurality of links connecting the joints to each other, wherein the robotic arm is connected to a robot controller that is designed and configured to control a plurality of electric motors and brakes of the robotic arm which are associated with the respective joints in order to move the robotic arm, the method comprising:
   (a) automatically executing a brake test procedure associated with the robotic arm to control the electric motors and brakes via the robot controller, in order to automatically move the links of the robotic arm in accordance with a brake test program specified by the brake test procedure, and to automatically control the brakes;
   (b) in accordance with the brake test program, automatically driving at least one motor of the plurality of electric motors in a first rotational direction and detecting a first motor torque in the at least one motor during rotation in the first rotational direction, and subsequently automatically driving the at least one motor in a second rotational direction, opposed to the first rotational direction, and detecting a second motor torque in the at least one motor during rotation in the second rotational direction;
   automatically evaluating the first motor torque and the second motor torque in order to obtain a first moment of friction of the respective joint associated with the at least one driven motor;
   repeating method steps (a) and (b) at a later point in time;
   automatically evaluating the first motor torque and the second motor torque obtained at the later point in time in order to obtain a second moment of friction of the respective joint associated with the at least one driven motor;
   comparing the second moment of friction to the first moment of friction; and assessing the friction status of the joint associated with the at least one driven motor as defective in response to a deviation of the second moment of friction from the first moment of friction exceeding a prespecified threshold value.

2. The method of claim 1, wherein automatically evaluating the first motor torque and the second motor torque in order to obtain the first moment of friction comprises calculating the moment of friction as half of the difference between the first motor torque and the second motor torque.

3. The method of claim 1, further comprising automatically assessing the friction status of the at least one joint as defective in response to the obtained first moment of friction exceeding a prespecified maximum torque.

4. The method of claim 3, further comprising:
determining the prespecified maximum torque based on a design-dependent rated torque of the brake associated with the joint driven by the at least one motor in which the first motor torque and the second motor torque were detected.

5. The method of claim 4, wherein determining the prespecified maximum torque comprises selecting a value of the prespecified maximum torque between 20 percent and 40 percent of the design-dependent rated torque value of the brake.

6. The method of claim 1, further comprising:
comparing the obtained first moment of friction to an original moment of friction determined in a delivery state or commissioning state of the robotic arm; and
assessing the friction status of the joint associated with the at least one driven motor as defective in response to a deviation of the obtained first moment of friction from the original moment of friction exceeding a prespecified threshold value.

7. The method of claim 1, wherein detecting the first motor torque and detecting the second motor torque comprises automatically determining from the first and second motor torques from the respective electric motor currents of the at least one motor during rotation in the first rotational direction and in the second rotational direction, respectively.

8. A robot, comprising:
a robotic arm including a plurality of joints connecting a plurality of links that are adjustably positionable relative to one another by the movements of the joints;
a plurality of motors and brakes, wherein a respective motor and a respective brake are associated with each joint, and wherein each motor is designed to adjust the respectively associated joint by automatic control of the motor; and
a robot controller designed to automatically control the motors in order to adjust the links of the robot arm automatically and individually relative to one another by driven movement of the joints, and to automatically control the brakes to individually brake the joints of the robot arm and hold the brakes in a locked condition;
wherein the robot controller is further designed and configured to carry out the method of claim 1.

9. A computer program product for detecting and evaluating a friction status in at least one joint of a robotic arm, the computer program product comprising a program code stored on a non-transient, computer-readable medium, the program code, when executed by a robot controller, causing the controller to carry out the method of claim 1.

\* \* \* \* \*